Figure 9:
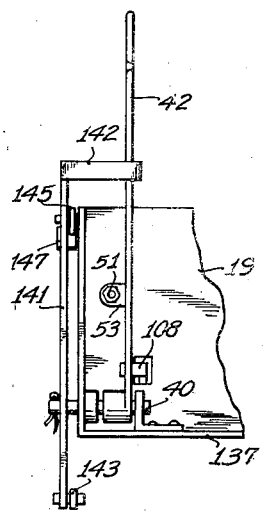

Nov. 9, 1943.  H. A. WAGNER ET AL  2,334,137
DRIVE CONTROLLER
Filed May 18, 1942   3 Sheets-Sheet 1
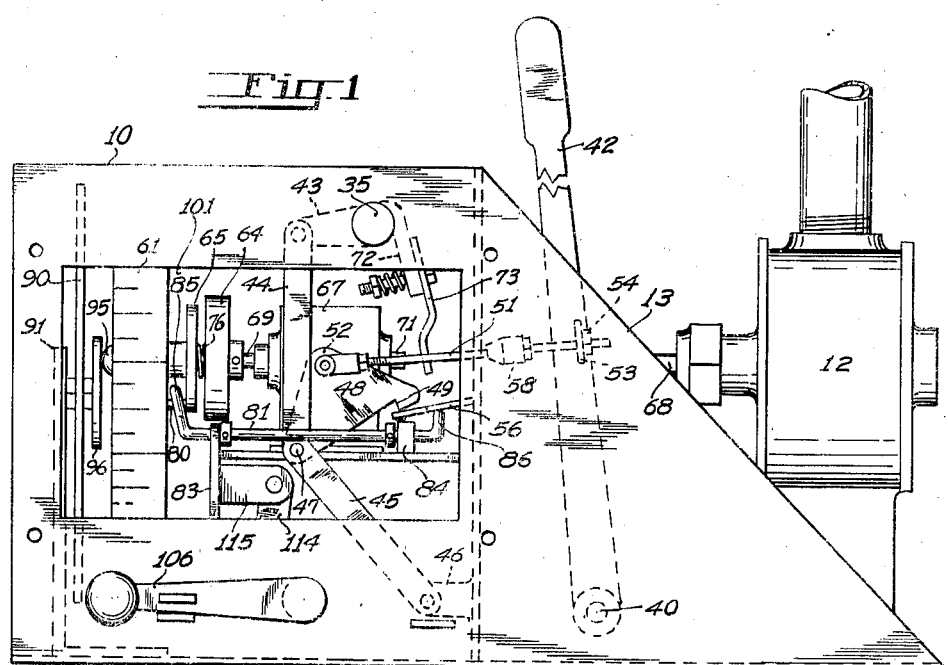
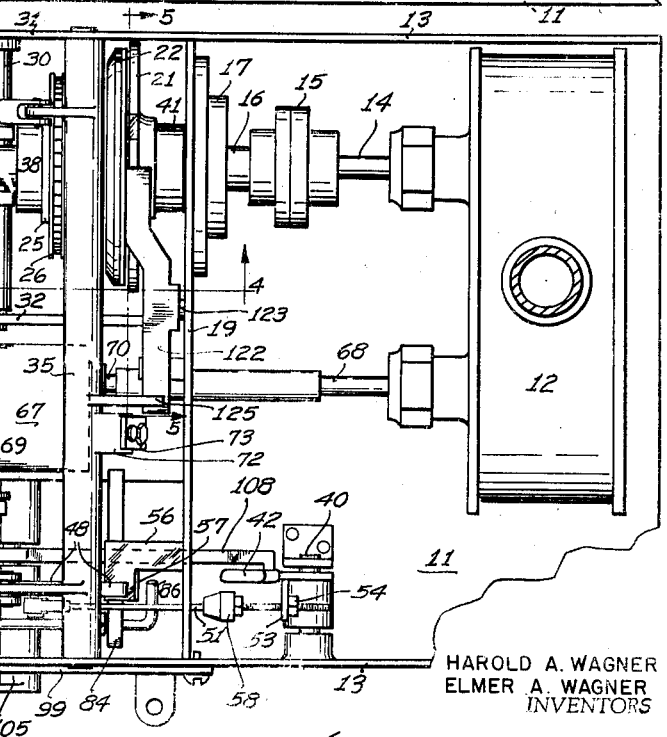
HAROLD A. WAGNER
ELMER A. WAGNER
INVENTORS
ATTORNEY Nov. 9, 1943.   H. A. WAGNER ET AL   2,334,137
DRIVE CONTROLLER
Filed May 18, 1942   3 Sheets-Sheet 2
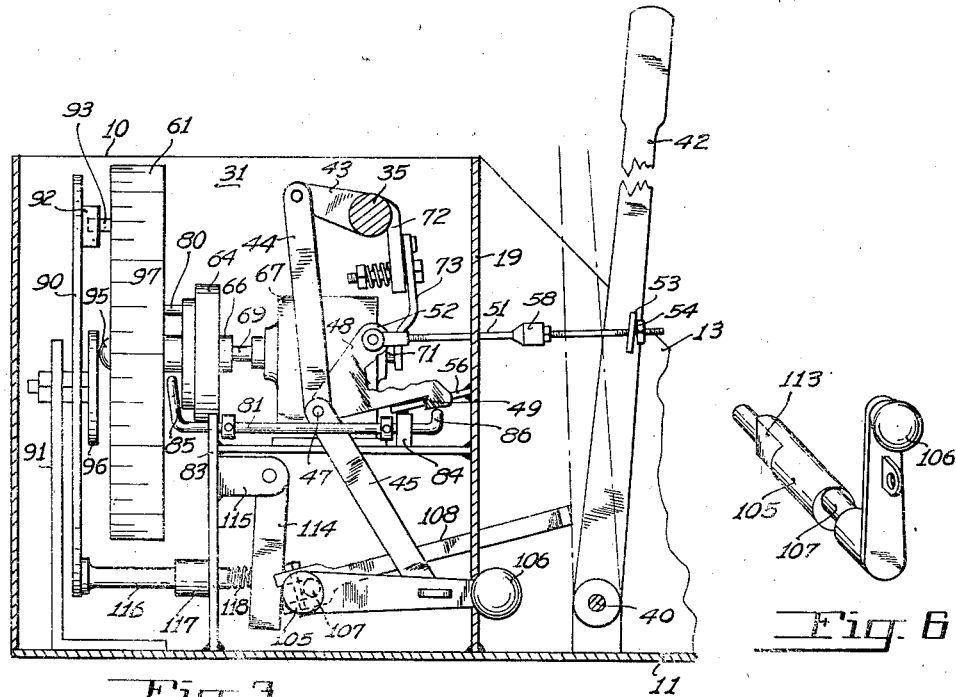
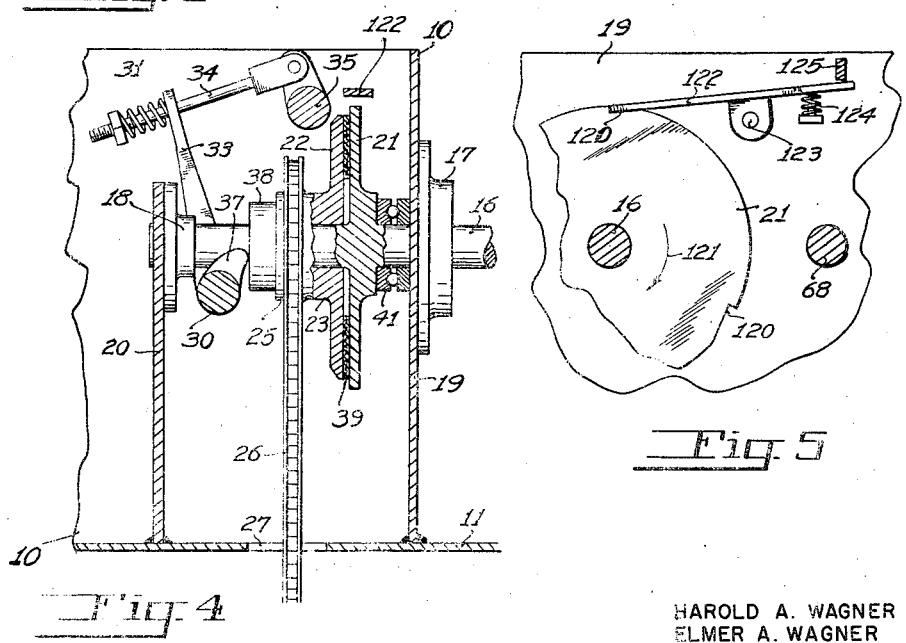
HAROLD A. WAGNER
ELMER A. WAGNER
INVENTORS
BY E. A. Buckham
ATTORNEY Nov. 9, 1943. H. A. WAGNER ET AL 2,334,137
DRIVE CONTROLLER
Filed May 18, 1942 3 Sheets-Sheet 3

HAROLD A. WAGNER
ELMER A. WAGNER
INVENTORS

BY
ATTORNEY

Patented Nov. 9, 1943

2,334,137

UNITED STATES PATENT OFFICE 2,334,137

DRIVE CONTROLLER

Harold A. Wagner and Elmer A. Wagner,
Portland, Oreg.

Application May 13, 1942, Serial No. 443,374

15 Claims. (Cl. 192—139)

This invention relates to drive control devices, and more particularly to devices for controlling a coupling connection between driving and driven means.

This application is a continuation-in-part of our copending patent application, Serial No. 409,180, filed September 2, 1941, and entitled Liquid measuring device.

In certain instances it is desired to drive apparatus intermittently from a continuously operating prime mover. This is particularly true in cases where the prime mover engine is connected for steadily driving a main load, and where the additional apparatus is of a relatively light load auxiliary type which may readily be carried by the main engine along with the main load or at least during intermittent periods. A suitable power take-off may be provided including a clutch or other similar coupling and which in turn may be controlled in accordance with the requirements of the apparatus to be driven therethrough. The controlling means for such a coupling may be adapted for either manual or automatic operation, or both. It is with arrangements of the latter type that the present invention is primarily concerned.

A general object of the present invention, therefore, is to provide a new and improved combined manual and automatic control arrangement for a driving connection.

More specifically, it is an object of the invention to provide a new and improved control arrangement for a coupling between driving and driven means, by which the initial engagement of the coupling may be effected manually and the disengagement thereof effected automatically following a predetermined period of operation.

A further object of the invention is to provide a new and improved control arrangement for a driving connection between driving and driven means whereby complete manual control may be had of the driving connection throughout a predetermined period of time, but, upon the termination of such period of operation, the driving connection will be disrupted automatically.

Another object of the invention is to provide a new and improved control arrangement for a driving connection between a driving and driven means including a manually operable control means and an adjustable automatic timing device for predetermining the period of operation of the driving connection in the event that it is not previously terminated through operation of the manual controller, the timing device being automatically reset to starting position upon breaking of the driving connection either by the manual controller or by the timing device.

A further object of the invention is to provide a new and improved control arrangement for a driving coupling between a driving and driven means including a manual controller, and an automatic timer for terminating the operation of the driving connection following initiation thereof by the manual controller with provision for locking the timer against unauthorized adjustment and also for locking the manual controller against operation for breaking the driving connection.

In accordance with an illustrated embodiment of the invention, a releasable connection such as a clutch is provided between a driving means, such as a continuously rotating shaft, and a driven device. The control means for the clutch includes a manual operating lever through which the clutch may be shifted to the engaged position and a latch arrangement for retaining the clutch in such position. The control means also includes an automatic timing device which is set into operation upon manipulation of the lever to the clutch engaging position and which is so arranged as to effect tripping of the latch after a predetermined period of operation of the driven device. The latch may also be tripped at any time within such period by moving the hand lever in the reverse direction. Following a tripping of the latch either by the timing means or by the hand lever, the timing means is automatically restored to the initial position. The timing means is adjustable so that the operating period for the driven means may be varied through a suitable range. A locking means is provided which, if desired, may be so set that the tripping of the latch can be effected only through operation of the timer. In a second position of the locking means the timer may also be locked against unauthorized adjustment thereof.

Further objects and advantages of the invention will appear from the following description, taken in connection with the accompanying drawings, while the features of novelty will be pointed out with greater particularity in the appended claims.

Figure 7:
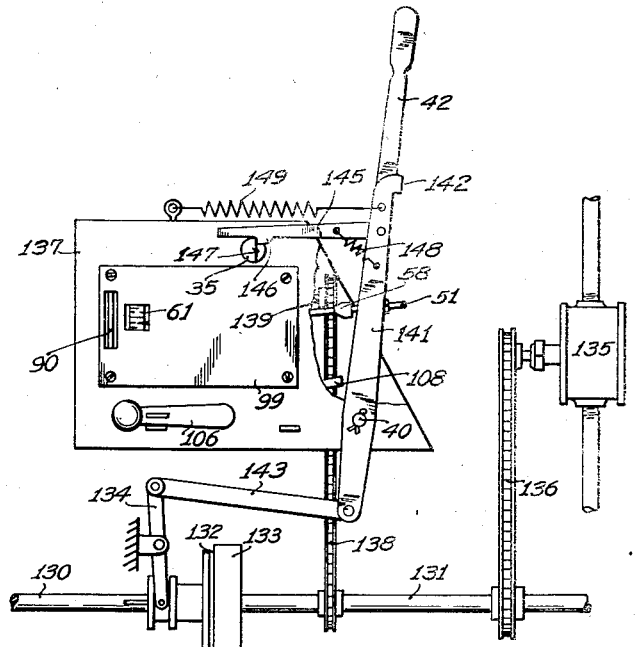
Figure 8:
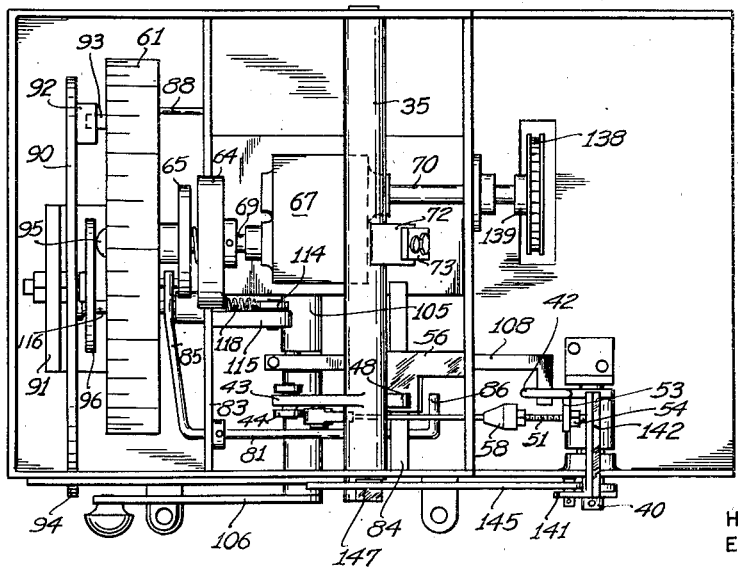

In the drawings, Figure 1 is a side elevation of a drive controller according to one form of the invention, a side cover plate of the housing being removed to show more clearly the arrangement of certain internal parts of the apparatus; Figure 2 is a plan view of the controller shown in Figure 1; Figure 3 is a side elevation of one portion of the drive controller mechanism illustrating certain parts in a second position of adjustment; Figure 4 is a cross sectional view taken along the line 4—4 of Figure 2; Figure 5 is a fragmentary view taken along the line 5—5 of Figure 2; Figure 6 is a view in perspective of one detail of the controller; Figure 7 is a side elevation of a controller for a driving connection according to a second modification of the invention; Figure 8 is a plan view of the control device illustrated in Figure 7; and Figure 9 is an end view of a portion of the controller of Figure 7.

In the ensuing description the control arrangement will be described as it may be adapted for effecting the control of the driving connection to a liquid delivery pump such as may be provided on a concrete mixer for supplying predetermined measured quantities of water to the mixer drum. It will become obvious, however, as the description proceeds, that the control arrangement of the instant invention is not to be necessarily limited in its applicability to a pump, but that this is merely one typical form of a driven means, the operation of which is to be controlled.

Referring more particularly to Figures 1 to 6, inclusive, of the drawings, the controller mechanism of the invention comprises a sheet metal housing, indicated generally at 10, having a base plate 11, one end of which extends considerably beyond the housing proper, thereby providing a mounting platform for an auxiliary device to be driven therefrom such as a fluid delivery pump 12. The extension of the base is supported by downwardly tapered side wall portions 13 of the housing. The pump 12 is illustrated as being of the double element rotating type having a shaft 14 which is connected by coupling 15 to the driven shaft 16 extending from the controller. The shaft 16 is suitably journaled in bearings 17 and 18 which are mounted upon the housing side wall 19 and upon an inner wall portion 20, respectively. As illustrated more clearly in the cross sectional view of Figure 4, the shaft 16 is adapted to be driven through cooperative frictional engagement between the clutch plates 21 and 22, the clutch plate 21 being rigidly secured to the shaft 16, while clutch plate 22 is mounted upon a hub 23 which in turn is freely rotatably arranged upon shaft 16 and slidably thereupon in the axial direction. The hub 23 is provided with a sprocket 25 which is adapted to be driven by a chain 26 trained thereabout and extending downwardly through an opening 27 in the base 11 of the housing and connected to a shaft driven by a suitable prime mover (not shown). It is to be understood that the prime mover is normally continuously rotating, or, at least, during such periods that the pump auxiliary 12 is to be intermittently operated. Thus the clutch element 22 is normally continuously driven through chain 26 and for intermittently driving the pump 12 the clutch elements 21 and 22 are shifted relatively towards each other to the engaged position for effecting a driving connection therebetween.

The operating means for the clutch comprises a rocker shaft 30 extending at right angles beneath the shaft 16 between the clutch and the shaft bearing 18, the opposite ends of the rocker shaft 30 being suitably journaled in the outer housing side wall 31 and an inner wall portion 32. The rocker shaft 30 is provided with a right angularly extending lever arm 33 which is connected by link 34 to a second rocker shaft 35 for operation thereby. The rocker shaft 30 is provided with yoke projections 37 extending upwardly adjacent opposite sides of the shaft 16 and are adapted to engage with the end bearing portion 38 of the driving hub 23 of the clutch. Upon movement of the rocker shaft 30 in the clockwise direction as viewed in Figure 4, the yoke portions 37 engage with the hub bearing 38 to shift the clutch plate 22 axially of the shaft 16 to the right and compress the friction disc 39 between it and the clutch plate 21, thereby effecting driving connection for the shaft 16. A suitable thrust bearing 41 is provided between the hub of the clutch plate 21 and the adjacent housing wall 19. Upon a releasing of the rocker arm 30 the clutch plate 22 will pull away from the clutch plate 21, breaking the driving connection therebetween.

The operating shaft 35 extends transversely of the housing, that is, at right angles with respect to the driven shaft 16, and is journaled at its opposite ends in the housing side walls. The operating shaft is connected for actuation by any suitable means such as lever 42 pivotally mounted as at 40 upon the base 11. It will readily be understood, as the description proceeds, that the lever 42 may be operated manually, directly or indirectly, or by any suitable automatic condition responsive device. The operating shaft 35 is provided with an arm 43 to which is connected a toggle comprising links 44 and 45, the lowermost end of the link 45 being pivotally mounted upon a fixed bracket 46. Attached to the central pivot 47 of the toggle links 44, 45 is a triangularly shaped latch plate 48 having a latch 49 formed in the lower end thereof. The operating lever 42 is connected by a link 51 to the upper corner 52 of the latch plate 48. The outermost end of the link 51 extends through an opening provided in an ear 53 attached to the side of the lever 42, a stop 54 being provided on the outer end of the link 51 so that upon rotation of the lever 42 in the clockwise direction of rotation about its pivotal support 40 the latch plate 48 will be shifted to the right, straightening the toggle links 44, 45. Because of the fact that the lower end of link 45 is stationarily anchored, straightening of the toggle links will cause an upward movement of the outer end of the operating shaft arm 43 to cause rotation of the operating shaft 35 in the clockwise direction. In the released position of the latch 49, as illustrated in Figure 1, the nose of the latch rests upon a plate 56 rigidly secured to and extending outwardly from the housing side wall 19. The plate 56 has a portion cut away so as to define a shoulder 57 to be cooperatively engaged by the latch 49 upon movement of the latch plate 48 to the extreme right position through operation of lever 42 in the clockwise direction. It will be observed that by virtue of the fact that the connection of the link 51 to the latch plate 48 is above the line extending between the toggle pivot 47 and the portion of plate 56 supporting the nose of the latch 49, the latch 49 is held firmly against the plate 56 upon movement of lever 42 to the right. Thus, when the latch 49 clears the shoulder 57 it will be moved into latching engagement therewith as indicated more clearly in the view of Figure 3. In this position of the latch the clutch 21, 22 is held in the engaged position for effecting driving of the auxiliary 12.

A releasing of the latch 49 may be effected by movement of the operating lever 42 in the reverse direction, or to the left. The link 51 is provided with a second stop 58 which, upon engagement by the ear 53 on the lever 42, will exert a force upon the latch plate 48 in the counterclockwise direction of rotation to raise the latch 49 from behind the shoulder 57 of plate 56, thereby permitting collapsing movement of the toggle links 44, 45 and rotation of the operating shaft 35 in the clutch releasing direction.

Means are provided for effecting automatically the release of the latch 49 following a predetermined period of operation of the auxiliary driven device 12 independently of the operating lever 42 once the clutch 21, 22 has been shifted to the engaged position thereby. The timing device comprises a dial controller 61 supported for free rotation about a shaft 62. The dial controller is adapted to be connected for rotation with the driven auxiliary 12 through a releasable driving connection such as a clutch. As illustrated, the hub of the dial controller is provided with a clutch disc 65 which is adapted to be driven from a cooperating driving disc element 66. The disc element 66 is covered with a friction facing 64, such as rubber. In the modification illustrated in Figures 1 to 6, inclusive, the controller clutch 65, 66 is adapted to be driven through a gear reduction unit 67 from shaft 68 extending from one of the rotating elements of the pump 12. It will be understood that this particular driving connection is convenient in the specific application shown, though it will be obvious that the gear reduction device 67 may be equally well connected for direct operation by the shaft 16. The shaft 69 of the gear reduction device 67 supporting the clutch disc 66 is axially movable, at least a short distance, through the housing of the gear reduction device. The shaft 69 projects from the opposite side of the housing with respect to the clutch disc 66, as indicated at 71. Depending from one side of the operating shaft 35 is a lever portion 72 upon the end of which is resiliently mounted a second lever portion 73, the outer end of which portion 73 is adapted to be moved into engagement with the end 71 of the shaft 69 upon rotation of the operating shaft 35 in the clockwise direction to effect movement of the shaft 69 to the left. Such movement of the shaft 69 effects driving engagement between the clutch elements 65 and 66 and hence rotation of the dial controller 61 loosely mounted on the shaft 62. The clutch element 66 and shaft 69 are normally biased to the right, or to the clutch disengaged position, by means of a small spring 76 extended therebetween and arranged about the shaft 62. The shaft 62 is secured rigidly to the hub of the clutch disc element 66.

The dial controller 61 is provided with an eccentric stop pin 80 which may be secured to and extend rearwardly from the clutch disc 65, the opposite end of which pin may be secured in a second annular disc portion 82 spaced from the disc 65. Adapted to be operated by the eccentric stop pin 80 is a latch tripping member 81 suitably journaled adjacent its opposite ends in brackets 83 and 84 fixed to the housing structure. The member 81 is provided with one lever arm 85, the outermost end of which extends into the space between the discs 65 and 82 and in the path of movement of the stop pin 80. The opposite end of the member 81 is provided with a lever portion 86 which extends adjacent the end of the latch 49 hooked over the shoulder 57 of plate 56, as shown more clearly in Figure 3.

Upon operation of the lever 42 to the clutch engaged position for initiating the operation of the auxiliary device 12, the controller dial clutch 65, 66 will simultaneously be moved to the engaged position, whereupon the dial controller 61 will be rotated at a rate corresponding with the rate of operation of the auxiliary device 12. Following a predetermined period of operation of the auxiliary device 12, and hence, a predetermined angle of movement of the dial controller 61, the stop pin 80 will engage with the end of the arm 85 to effect rotation of the crank arm 86 to cause lifting of the latch 49 from behind the shoulder 57 of plate 56. Upon such tripping of the latch 49 the main clutch 21, 22 will automatically be moved to disengaged position, and simultaneously the controller dial clutch 65, 66 will also be disengaged.

Upon movement of the dial controller clutch 65, 66 to the disengaged position, the dial controller is automatically restored to a set position by means of a helical spring 87 secured at one end to the hub of the dial controller 61 and at the other end to a stationary bracket 88. Movement of the controller dial 61 to the reset position is determined by means of a setting disc 90 rotatably mounted upon a suitable support 91. The disc 90 is provided with a radially extending stop plate 92 which projects outwardly from the face thereof and which is adapted to be cooperatively engaged by a stop pin 93 secured to and extending outwardly from the adjacent side of the dial controller 61. A peripheral edge portion of the setting disc 90 extends outwardly through a slot in a side wall of the housing as indicated at 94 whereby the setting disc 90 may be manually adjusted for predetermining the set position of the dial controller 61. In the specific embodiment illustrated in the drawings, the setting disc 90 is shown mounted eccentrically relative to the dial controller 61, but such arrangement is merely a matter of convenience whereby the overall size of the apparatus may be kept at a minimum. It will readily be understood that inasmuch as the edge of the setting disc 90 is to extend beyond the side wall of the housing, and the dial controller 61 is to be contained wholly therewithin, if the two discs were to be coaxially mounted, then the setting disc 90 would have to be larger in diameter than the dial controller 61. By arranging the two dials eccentrically as shown, the diameter of the setting disc 90 may be kept within reasonable dimensions. A disc 96 secured to the end of the shaft supporting the setting disc 90 extends adjacent the end of a button 95 inserted into the end of the axial bore through the hub of the dial 61. The disc 96 acts as a stop to prevent movement of the dial 61 off of the end of the supporting shaft 62 upon which the dial controller is mounted for free rotation. Ample space exists between the adjacent ends of the button stud and the shaft 62 so as to permit axial movement of the shaft 62 as the clutch 65, 66 is engaged.

The dial controller 61 is provided with a cylindrical peripheral flange portion 97 which may be suitably graduated and calibrated in accordance with the operational characteristics of the auxiliary device 12 and which indicia may be read with reference to a pointer 98 through a window provided in the cover plate 99 attached to the side wall of the housing over the enlarged opening 101.

In the arrangement thus far described the main clutch 21, 22 may be shifted to the engaged position by means of the operating lever 42, in which position it is retained by means of the latch arrangement 48, 49 until the latch is tripped either by reverse movement of the operating lever or automatically by operation of the timer device. It may be desired to so adjust the controller as to insure that the driven device, when its operation is once initiated, will continue in operation for a predetermined period of time beyond the further control of the operator. The controller device of the present invention includes a cam shaft 105, shown more clearly in the perspective view of Figure 6, which is suitably journaled within the lower portion of the housing and having one end extending beyond the side wall thereof and provided with a handle 106 for manual control. The cam shaft 105 is provided with one eccentric 107 upon which is mounted an arm 108, the opposite end of which arm extends through a cooperating opening in the housing wall 19 and is guided thereby in a direction extending toward the operating handle 42. When the handle 106 is operated to the position illustrated in Figure 3, the outermost end of the arm 108 extends into the path of movement of the operating lever 42 so as to prevent movement of the lever into engagement with the stop 58 on the latch controlling link 51, which is necessary in order to effect a tripping of the latch 49 by the operating handle. The handle 106 may be locked in such position by means of a padlock extending through eyelets provided on the handle 106 and on the housing, respectively. When the handle 106 is shifted to the vertical position or to the directly opposite position, then the arm 108 is withdrawn sufficiently from the path of movement of the operating lever 42 to permit engagement of the stop 58 by the lever to effect tripping of the latch mechanism 48.

Also provided on the cam shaft 105 is a second eccentric 113 formed by removing one side portion of the shaft 105 and which eccentric is arranged in line with a lever 114 pivotally mounted upon a bracket 115 secured relative to the housing. Adapted to be engaged by the swinging end of the lever 114 is a plunger 116 slidably arranged within a bushing 117, the outer end of the plunger 116 being adapted to engage with the side of the periphery of the setting disc 90. In the vertical position of the handle 106 the lever 114 is permitted to swing in the counterclockwise direction about its pivotal support, thereby releasing the pressure through spring 118 upon the end of the plunger 116, thus permitting free adjustment of the setting disc 90 and hence of the dial controller 61. Upon movement of the handle 106 either to the extreme right or left positions, as shown in Figure 1, the cam 113 will effect movement of the lever 114 in the clockwise direction to compress the spring 118, thereby forcing the plunger 116 into engagement with the disc 90. The peripheral edge portion of the disc 90 is preferably knurled in order to facilitate manual adjustment thereof upon grasping the edge portion 94 projecting beyond the side wall of the housing. The end of the plunger 116 is similarly knurled and is so arranged as to engage with the knurled edge portion of the setting disc 90 within the housing so that a relatively slight pressure exerted through the plunger 116 will firmly hold the setting disc 90 against unauthorized adjustment in either of the locked positions of the handle 106.

In order positively to prevent further rotation of the driven device 12 following disengagement of the main clutch 21 and 22, such as may occur upon dragging of the clutch elements following release of the operating shaft 35, an arrangement is provided such as is illustrated more clearly in Figure 5. The periphery of the driven clutch disc 21, which extends somewhat beyond the periphery of the driving clutch disc 22, is provided with notches 120 facing in the direction of driven rotation, as indicated by the arrow 121. A lever 122, pivoted intermediate its ends as at 123 upon the housing wall 19, is normally biased into engagement with the peripheral edge of the clutch disc 21 by means of a spring 124 acting thereagainst. The operating shaft 35 is provided with an arm 125 which, upon movement of the operating shaft to the clutch engaged position, engages with the outer end of the lever 122 to remove the opposite end thereof from the disc 21. Upon rotation of the operating shaft 35 in the opposite direction, or to the clutch releasing position, the lever 125 is removed from the lever 122 which thereupon is forced by spring 124 into engagement with the notched peripheral edge of the disc 21 and further rotation of the disc, and hence of the driven device 12, is precluded.

In the modification just described a controller is provided as a complete unit including as an element thereof a main clutch through which the driving connection is established for an auxiliary driven device, which device may, furthermore, be mounted upon an extension of the base plate of the controller. Obviously, the invention is not necessarily to be so limited in that the timer mechanism may be provided as a separate integral unit and which may be arranged for controlling the operation of an operating lever for a clutch mounted externally of the controller housing. The modification illustrated in Figures 7 to 9 is adapted for use in connection with such an externally arranged clutch. Referring more particularly to the view of Figure 7, a driving means is shown in the form of a drive shaft 130 supported in suitable bearings (not shown) coaxially with a driven shaft 131, cooperating clutch elements 132 and 133 being secured to adjacent ends thereof for effecting a driving coupling therebetween. The clutch element 132 may be slidably mounted on the shaft 130 and adapted for operation through a suitable shifter arm 134. An auxiliary device 135 such as a pump is connected by chain 136 to the driven shaft 131 for operation thereby. For controlling the coupling between the clutch elements 132 and 133 is a controller unit 137 which is substantially similar to the controller as previously described without the main driving clutch 21, 22 and such other associated elements as the rocker operating shaft 30 and the clutch engaging lever 122 embodied therein. The dial controller mechanism is in this instance driven through a chain 138 from the driven shaft 131 which chain is trained over a sprocket 139 provided on the end of the shaft 70 extending from the gear reduction unit 67.

Mounted on the outside of the controller housing and pivoted coaxially with the operating lever 42 is a clutch operating lever 141, the upper end of which is provided with a right angular arm portion 142 extending behind the lever 42. The lower end of the lever 141 is connected by link 143 to the upper end of the clutch shifter arm 134. Pivotally attached to the upper end of the lever 141 is a latch arm 145 having a latch 146 thereon for engaging with a squared shoulder 147 formed on the end of the operating shaft 35 extending beyond the outer side wall of the housing of the controller 137. The latch arm 145 is biased downwardly by spring 148 suitably connected between the latch arm and the lever 141, while the lever 141 itself is biased in a counterclockwise direction, or toward the controller, by a spring 149 connected therebetween.

In Figure 7 the apparatus is shown in the set or clutch engaged position, the clutch being retained in such position by virtue of the fact that the latch arm 145 is hooked behind the squared shoulder 147 on the end of the controller shaft 35. In this position the shaft 131 is driven by the shaft 130 and hence both the auxiliary device 135 and the timer controller are simultaneously driven through chain connections 136 and 138, respectively, with shaft 131. Following a predetermined period of rotation of the shaft 131, depending upon the setting of the controller, the latch mechanism 49 thereof will be tripped in the manner as previously described, resulting in a collapsing of the toggle arms 44, 45 and rotation of the operating shaft 35 of the controller in a counterclockwise direction. Upon rotation of the shaft 35 in such direction, the latch 146 of the arm 145 will slide from the shoulder 147 to permit movement of the clutch operating arm 141 in the counterclockwise direction of rotation under the force of the biasing spring 149. Such movement of the lever 141 will effect sliding movement of the clutch element 132 upon shaft 130 away from the clutch element 133 and hence the driving coupling therebetween is disrupted. Resetting of the apparatus is effected by movement of the lever 42 in the clockwise direction of rotation, which will carry with it the lever 141, simultaneously resetting the controller mechanism and shifting the clutch 132, 133 to the engaged position, the lever 141 being latched in such position by the arm 145.

With the controller locking handle 106 in the position shown in Figure 7, the controller may be tripped at any time by movement of the lever 42 in the counterclockwise direction of rotation and into engagement with the stop 58 on the link 51 as previously described. Tripping of the controller through lever 42 will effect rotation of the shaft 35 and release of the latch arm 145 to permit movement of the clutch 132, 133 to the disengaged position.

Having described the principles of the invention in what is considered to be preferred embodiments thereof, it is desired that it be understood that the various specific details shown and described are merely illustrative, and that the invention may be carried out by other means.

We claim:

1. In combination, a driving means, a driven means, a clutch between said means, a device operatively connected to said driven means, a manually operable control means for said clutch, holding means operably associated with said manually operable means for holding said clutch in the engaged position, an adjustable control dial, clutch means connecting said dial for rotation by said driven means, lever means operable upon predetermined angular movement of said dial for effecting release of said holding means, and means associated with said dial for automatically restoring said dial to the adjusted position following each operation of said lever means.

2. In combination, a driving means, a driven means, a clutch between said means, manually operable control means for said clutch, a holding means operable upon movement of said control means to clutch engaging position for holding said clutch in the engaged position, and adjustable control dial, means operatively connecting said control dial to said driven means, lever means operable upon predetermined angular movement of said control dial for effecting release of said holding means, and means for restoring said dial to the adjusted position following each release of said holding means.

3. In combination, a driving means, a driven means, a clutch between said means, manual operating means for said clutch, a holding means for holding said operating means in the clutch engaged position, an adjustable control dial connected for operation by said driven means, lever means operable by said dial upon predetermined angular movement thereof for effecting tripping of said holding means, and means for automatically restoring said dial to the adjusted position following each tripping of said holding means.

4. In combination, a drive shaft, a driven shaft, a clutch between said shafts, operating means for said clutch, a holding means for retaining said operating means in the clutch engaged position, means biasing said operating means to the clutch releasing position, an adjustable control dial, means operatively connecting said dial for rotation by said driven shaft, lever means operable by said control dial upon predetermined angular movement thereof for releasing said holding means to permit movement of said clutch to released position, and means connected to said dial for automatically restoring said dial to the adjusted position following each releasing operation of said clutch.

5. In combination, a driving means, a driven means, a clutch between said means, operating means for shifting said clutch to the engaged position, means biasing said operating means to the clutch released position, a holding means for holding said operating means in the clutch engaged position, a control dial, means biasing said dial for rotation in one direction, a dial clutch for operatively connecting said control dial to said driven means for rotation thereby in the opposite direction, means operable by said operating means for causing engagement of said dial clutch simultaneously with engagement of said first clutch, and means connected to said dial and operable upon predetermined angular movement of said dial for effecting release of said clutches.

6. In combination, a driving means, a driven means, a clutch for operatively connecting said means, control means for shifting said clutch to engaged position, means biasing said control means to clutch releasing position, a holding means operatively connected to said operating means for holding said operating means in the clutch engaged position, a control dial, means operatively connecting said control dial with said driven means, a spring connected to said dial biasing said dial away from a first limit position, a manually adjustable stop providing a second limit position for said dial, a stop on said dial, a lever engageable by said last mentioned stop upon movement of said dial to said first limit position for releasing said holding means.

7. In combination, a driving means, a driven means, a clutch for operatively connecting said means, operating means for said clutch, a holding means operatively connected to said operating means for retaining said operating means in the clutch engaged position, a control dial, a clutch connecting said dial for rotation with said driven means, means for effecting engagement of said dial clutch simultaneously with engagement of said first clutch, means biasing said dial away from a first limit position, an adjustable stop providing a second limit position for said dial under the force of said biasing means, a stop on said dial, a lever engageable by said last mentioned stop upon movement of said dial to said first limit position, said lever engaging said holding means to effect release thereof and movement of said clutches to released position.

8. In combination, a driving means, a driven means, a clutch for operatively connecting said means, operating means for shifting said clutch to the engaged position, holding means for holding said operating means in the clutch engaged position, means biasing said operating means to the clutch releasing position, a rotatable controller, clutch means connecting said controller for rotation in one direction by said driven means, said operating means including means for effecting engagement of said controller clutch simultaneously with the engagement of said first clutch, spring means biasing said controller in an opposite direction of rotation, manual means for adjusting said controller to a set position, a stop on said controller, and means operatively connecting said stop and said holding means whereby said holding means is released upon predetermined angular movement of said controller by said driven means.

9. In combination, a driving means, a driven means, a clutch for operatively connecting said means, operating means for said clutch, holding means operatively connected to said operating means for holding said operating means in the clutch engaging position, means biasing said operating means to the clutch releasing position, a controller, means including a clutch operatively connecting said controller for rotation in a first direction by said driven means, said operating means including means for effecting engagement of said controller clutch simultaneously with engagement of said first clutch, means biasing said controller away from a first limit position in a second direction of rotation, a manually adjustable stop providing a second limit position for said controller, said controller normally held against said stop by said biasing means, a stop on said controller, lever means engageable by said last mentioned stop upon movement of said controller to said first limit position through driving connection with said driven means, said lever effecting release of said holding means to permit movement of said clutches to releasing position.

10. In combination, a driving means, a driven means, a clutch for operatively connecting said means, a rocker arm for operating said clutch to the engaged position, an operating lever for rotating said rocker arm to the clutch engaged position, holding means for retaining said rocker arm in the clutch engaged position, a controller, means including a clutch for operatively connecting said controller for rotation by said driven means, means extending from said rocker arm for effecting engagement of said controller clutch simultaneously with engagement of said first clutch, a stop on said controller, a lever operable by said stop upon movement of said controller to a predetermined limit position through connection with said driven means, said lever arranged for effecting release of said holding means and permitting simultaneous movement of said clutches to released position, and means for returning said controller to a second limit position upon release of said controller clutch, and manually adjustable means for limiting movement of said controller to said second limit position.

11. The combination comprising a driving means, a driven means, a clutch for operatively connecting said means, an operating lever for effecting shifting of said clutch to the engaged position, a holding means for retaining said operating lever in the clutch engaged position, a rotatable controller, means including a clutch for connecting said controller for rotation by said driven means, said operating lever including lever means for effecting engagement of said controller clutch simultaneously with engagement of said first clutch, a stop on said controller, a releasing lever for said holding means arranged for actuation by said stop upon movement of said controller to a first limit position through connection with said driven means, spring means for returning said controller to a second limit position upon release of said controller clutch, and manually adjustable means for determining said second limit position of said controller.

12. The combination comprising a driving means, a driven means, a clutch for operatively connecting said means, an operating lever for effecting engagement of said clutch, means biasing said operating lever to the clutch releasing position, a holding means for retaining said operating lever in the clutch engaging position, a rotatable controller, means including a clutch for operatively connecting said controller for rotation from said driven means, said operating lever including means for effecting engagement of said controller clutch simultaneously with engagement of said first clutch, a stop on said controller, a releasing lever for said holding means adapted to be engaged by said stop upon movement of said controller through a predetermined angle by said driven means, lever means connected to said operating lever and operable upon movement thereof to the clutch releasing position for precluding further rotation of said driven means.

13. The combination comprising a driving means, a driven means, a clutch for operatively connecting said means, lever means for effecting movement of said clutch to the engaged position, holding means for retaining said lever means in the clutch engaged position, a manual control lever movable in one direction for shifting said lever means to the clutch engaged position, said manual control lever being movable in the reverse direction for effecting release of said holding means, a controller, means including a clutch for operatively connecting said controller for rotation by said driven shaft, a stop on said controller, a releasing lever for said holding means operable by said stop upon predetermined angular movement of said controller from said driven shaft, a setting means for said controller for determining the angular movement of said controller required to effect actuation of said latch releasing lever, means for locking said setting means, and means operable by said locking means for precluding releasing of said holding means by said manual control lever.

14. The combination comprising a driving means, a driven means, a clutch for operatively connecting said means, an operating means for effecting engagement of said clutch, a manual control lever for effecting operation of said operating means to clutch engaging position, a holding means for retaining said operating means in the clutch engaged position, said holding means being normally releasable by said manual control lever for effecting disengagement of said clutch, a control dial, means connecting said control dial for rotation by said driven shaft upon engagement of said clutch, means for setting said control dial, means for locking said setting means, said locking means including means for precluding release of said holding means by said manual control lever.

15. The combination comprising a driving means, a driven means, a clutch for operatively connecting said means, operating means for said clutch including a manually operable lever, a holding means for retaining said operating means in the clutch engaged position, said holding means being normally releasable by said lever, a controller connected to said driven means, a lever operatively connected between said controller and said holding means whereby said holding means is automatically released following a predetermined period of operation of said driven means, means for adjusting said controller for varying said period, and means for locking said adjusting means against unauthorized manipulation, said locking means including means for precluding tripping of said holding means by said manually operable lever.

HAROLD A. WAGNER.
ELMER A. WAGNER.